(No Model.) 3 Sheets—Sheet 1.
E. R. BLOOD.
MACHINE FOR MAKING CARBON OR GAS BLACK.
No. 269,378. Patented Dec. 19, 1882.
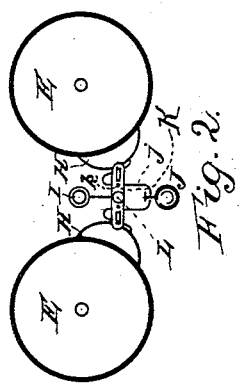
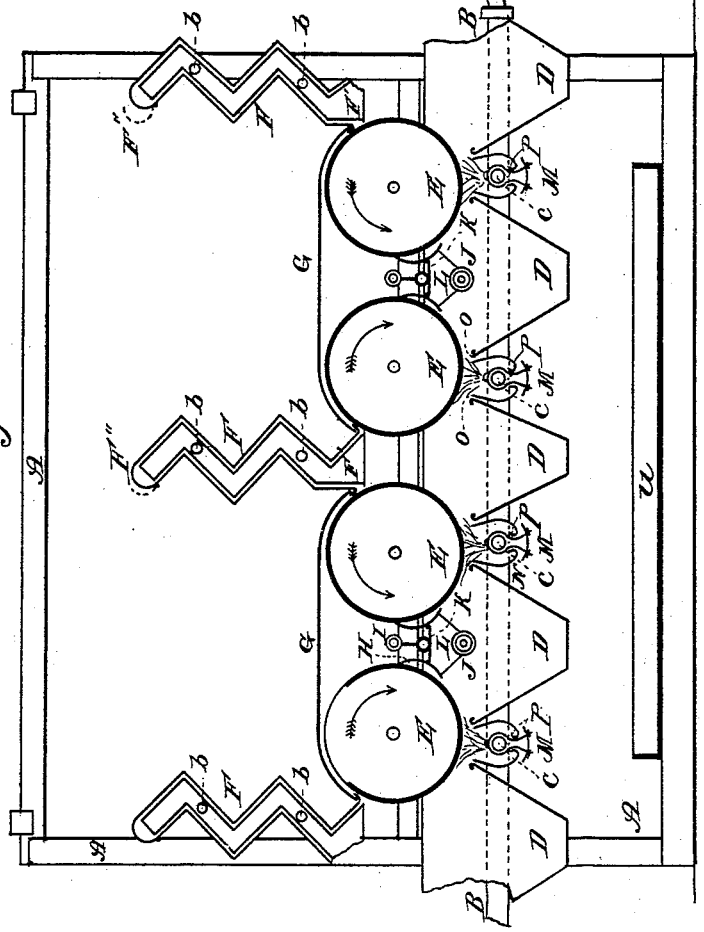
Witnesses: Inventor:
E. R. Blood
per Halleck & Halleck
Attys.

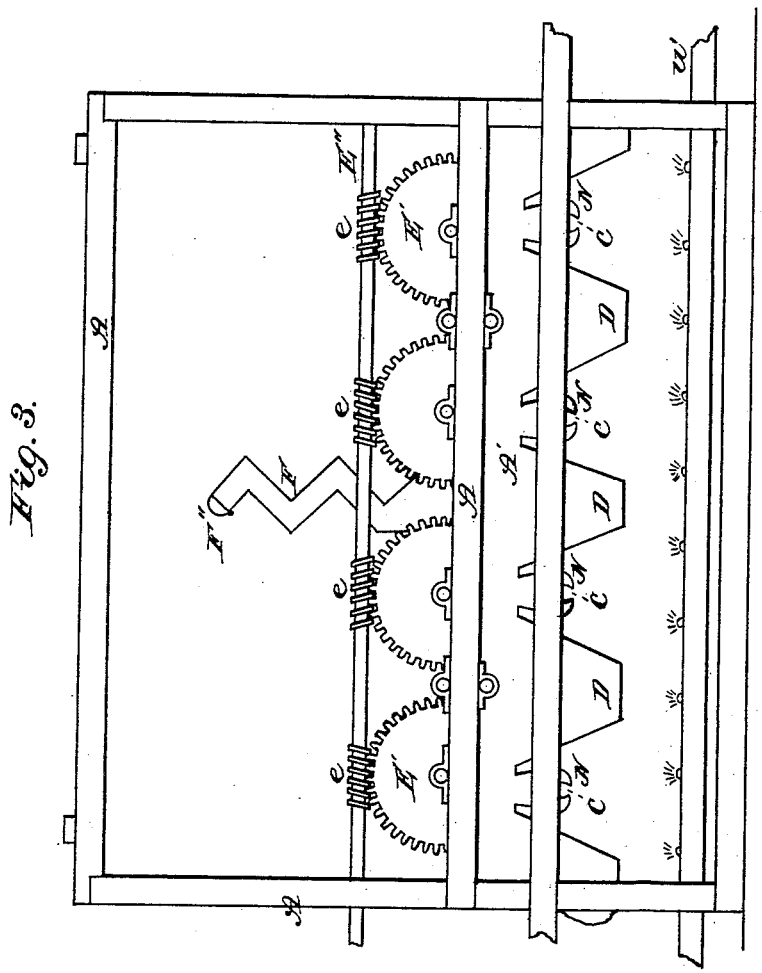

(No Model.) 3 Sheets—Sheet 3.
E. R. BLOOD.
MACHINE FOR MAKING CARBON OR GAS BLACK.
No. 269,378. Patented Dec. 19, 1882.
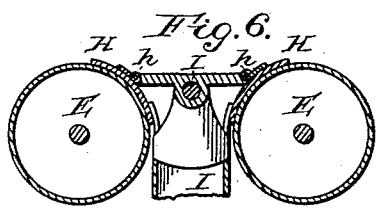
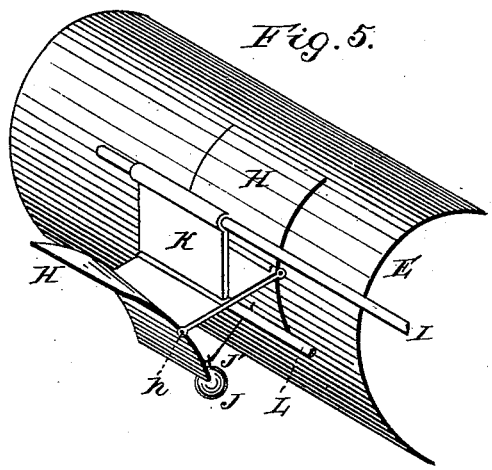
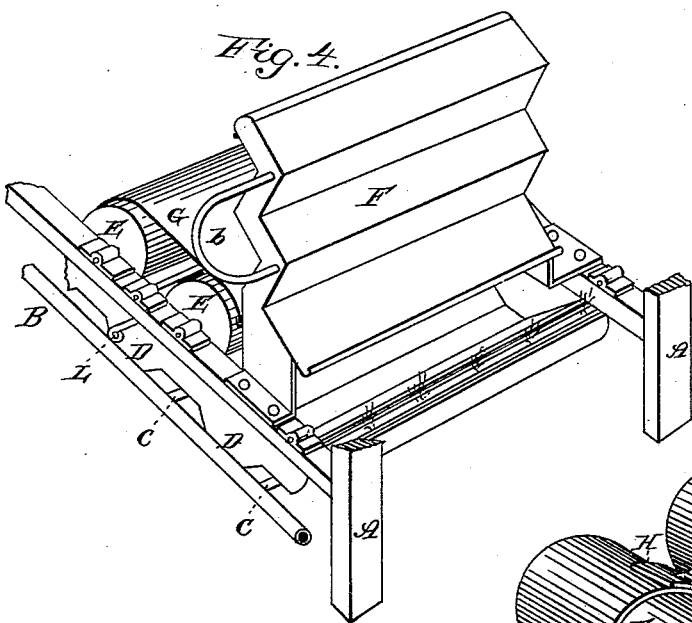
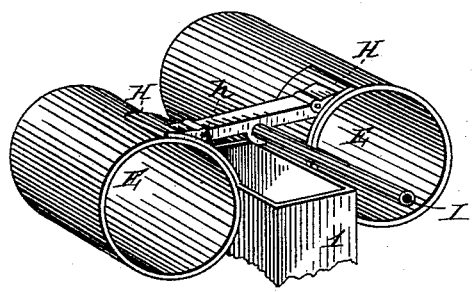
Witnesses:
Inventor:
E. R. Blood
per Hallock & Hallock
atty

UNITED STATES PATENT OFFICE.

ERASTUS R. BLOOD, OF ERIE, PENNSYLVANIA.

MACHINE FOR MAKING CARBON OR GAS BLACK.

SPECIFICATION forming part of Letters Patent No. 269,378, dated December 19, 1882.

Application filed November 5, 1881. (No model.)

*To all whom it may concern:*

Be it known that I, ERASTUS R. BLOOD, a citizen of the United States, and a resident of Erie, Erie county, Pennsylvania, have invented new and useful Improvements in Machines for Making Lamp-Black; and I do hereby declare that the following is a full, clear, and exact description thereof, reference being had to the accompanying drawings and the letters or figures of reference marked thereon.

My invention relates to devices for making lamp-black from a burning flame of hydrocarbon gas, oil, benzine, gasoline, or other like substances.

My invention consists of parts and combination of parts, all as will hereinafter be described in the specification and pointed out in the claims.

In the drawings, Figure 1 represents a vertical longitudinal section of my machine; Fig. 2, a detail, which will be explained in proper place; Fig. 3, a side elevation; Fig. 4, a perspective view of a fragment of the machine; Fig. 5, a perspective view of the scraper, and Figs. 6 and 7 modifications of the scraper.

A represents the frame-work; B, the gas or oil supply pipe; C, the service-pipes, or the pipes on which are located the burners; D the troughs or pans for catching the black when scraped off the depositing-surfaces; E, the depositing-surfaces, cylindrical in form, and arranged to be revolved or oscillated when desired. They are placed in pairs, and the members of each pair revolve toward each other from above, as shown by arrows thereon. Cylindrical depositing-plates are old, and I make no claim therefor. If these cylinders are oscillated in place of being revolved, they may be in the form of a cylinder with a longitudinal segment removed from the upper part, as shown at the left of Fig. 1, or they may be of a trough-like form. The depositing-plates are revolved or oscillated by means of cog-wheels E′, attached to the cylinders, and a shaft, E″, journaled in the ordinary manner, and provided with spirals or worms which gear with the cogs on wheels E′. When the cylinders are oscillated any well-known device for reversing motion may be attached to the shaft; but as such a construction is merely a common mechanical expedient, and as any skilled mechanic might easily substitute therefor many other appliances, I make no claim for the means of revolving the cylinders. So far as the means I employ to produce proper combustion are concerned, the form of the depositing-surfaces is not material; but I prefer to use them as shown.

Beneath the cylinders, and partly surrounding them, is a case, G, having extensions D and plates N N. These plates extend from front to rear of and are attached to the case in any suitable manner. They are preferably of the shape shown in cross-section, Fig. 1, and are placed one on each side of service-pipe C, which runs parallel to the plates, leaving an opening, *p*, at the bottom, directly below the pipe C, and a wide opening at the top, to allow the flames to pass through, thus forming a case which prevents lateral drafts of air from disturbing the flames. They also form a chamber, in which the air in a measure becomes rarefied before it enters the flame. A damper-plate, M, suspended in any suitable manner, but preferably from service-pipe C, as will hereinafter be described, may be placed below the opening P for the purpose of regulating the flow of air to the opening or passage, and thus further regulating the flow of air to the flame. By these devices the combustion of the gas is more retarded than would be the case if it were going on in the open air, and consequently the carbon is not consumed, but freed in the form of smoke. This device differs from the one patented to J. K. Hallock and myself, granted July 16, 1878, No. 205,955, in that in the latter it is stated that the upper arch of the tubes G has the office somewhat of a cover or deflector in a lamp, with the addition of a neck which surrounds the flame most of its way to the cylinders. In that form the air is confined by the upper part of the case until it becomes sufficiently heated to feed the flame, thus producing almost perfect combustion. This effect is sought to be and is avoided by forming the upper part of plates N N nearly vertical, giving, however, to them a slight inward curve, so that the air passing through slit P and deflected by service-pipe C will be forced toward the flame sufficiently to produce only a partial combustion. The main portion of the air, however, passes off through the opening between the tops of the plates without becoming sufficiently heated to aid the combustion, but rather retards it. The opening P, which is small and will not admit an abundant supply of air, is extended along the whole length of the case formed by plates N N, and gives a uniform supply of air to all the flames in said case. A plate, M, may be suspended on a wire passing around pipe C and down through opening P, and a screw-thread on each end and provided with nuts may be used to regulate the plate as to distance from the case.

In regard to that feature which relates to devices for supplying a jet of cold air to the flame at the point of and simultaneously with the impingement of the same upon the depositing-surfaces, the object is to chill the products of combustion, and thus assist the separation of the carbon-black from the products of combustion.

Between the sides of receiving trough or pan D and the sides of the case formed by plates N is an opening or passage, O, through which air passes into case A'. If the trough or pan D is not used, a sheet of metal may be placed to serve as one of the walls of the opening. I use the plates N to form one wall of this passage, because they are so located as to be serviceable for that purpose; but it is obvious that it may be formed of sheets of metal placed there specially for that purpose.

The essential feature of the device is that it conducts a thin current of cold air into the case to the point where the flame impinges upon the depositing-plates. This is accomplished in the machine shown by inclining the sides of the trough or pan in such a manner as to make them parallel or nearly parallel with the inclined tops of plates N. The air drawn in through opening O nearest the chimney, when one is used, will of course be more or less drawn away from the cylinder by the draft; but the air entering the opening near the scraper will impinge against the cylinder at the point where the flames strike. The effect of this cool current of air is to reduce the temperature, which reduction causes the flame to smoke and throw off a great quantity of black.

In regard to the devices for securing the particles of black which escape the depositing-plates, F represents a vertical zigzagged chimney, through which the products of combustion not retained by the depositing-plates escape. These, where cylindrical depositing-plates such as shown are used, are placed between each pair of rollers or cylinders. To prevent the products of combustion from escaping through the space between each pair of cylinders, I provide a cap, G, which covers the space and tops of the cylinders and rests upon flanges on the sides of chimneys F. These chimneys are placed at one side of the cylinders, so that the escaping products of combustion will pass with each cylinder as it revolves, thus carrying them between each pair of rollers and up into the vertically-placed zigzagged chimneys. As chimneys of a zigzagged form are old in lamp-black machines, I make no specific claim therefor. The object in this construction shown by me is to keep the escaping products of combustion moving in an upward direction, and at the same time cause them to frequently impinge against the wall or surface and deposit the soot thereon. I am also aware that chimneys of this kind have been used in metallurgic furnaces; but in these devices the accumulation of soot was sought to be avoided. My chimney serves a different purpose—that is, to retard the products of combustion without keeping them back until the moisture is deposited with the black. A hinged cap or cover, F'', which will open, as shown by dotted lines, on the top of chimney F, will serve to act as a damper, by which the velocity with which the products of combustion may pass up the chimney can be regulated. F' is a scraper for the zigzagged chimney. It consists of a flat piece of metal cut to conform to the shape of the chimney, as shown in Fig. 1, into which it is loosely fitted. It is operated by a handle, b, which extends outside of the chimney, as may be seen in Fig. 4.

In regard to the scrapers used for removing the black which has been deposited upon the depositing-plates, this feature of my invention is adapted only for use upon cylindrical depositing-surfaces. It is shown in Figs. 1 and 5, and with slight optional changes of construction in Fig. 2. Another form is shown in Figs. 6 and 7.

H H are the scraping-plates, which are curved, so that their upper, or, if desired, the upper and lower edges, which serve as scrapers, will come in contact with the cylinders. They are pivoted at their center to a cross-head, K, at h. A weight, J, may be rigidly attached by rods or wires i to the lower side of plates H, which are pivoted to the cross-head K, thus making the plates act as levers to force their upper edge against the cylinders. In Fig. 2 the plates are shown mounted in a slot formed in the cross-head K to allow the plates to move away from the cylinders when any unevenness in the latter presents itself. To accomplish this I provide S-shaped levers j, which are pivoted at k, and attached by one end to the weight J and by the other to the under side and lower ends of plate H, just below the point where it is pivoted. The tendency of this lever, when operated by the weight, is to lift the plate; but this effect is counteracted by the pivot, which forces both the upper and lower edges of the plates against the cylinders. The weight is suspended from the plates by a T-shaped pin, which rests upon the plates, but does not interfere with their motion. The upper edge, however, does the scraping. In one case the plate itself serves as a lever. In the other, Fig. 2, a special lever, j, is used.

It will be seen in Fig. 1 that the scraper is set so that the scraping-edge is below the center of motion of the cylinder. This is an essential feature of the construction, taken together with the flexibility secured by the weighted levers or plates. When the scraper sits on top of the cylinder and is held to its work by gravity or other pressure, it will wear off particles of iron from the cylinders and from itself, which particles damage the black. If the scraper is designed to scrape two cylinders at once while they are revolving, as shown in the drawings, except Figs. 6 and 7, and is set above the center of motion of the cylinders, as has heretofore been the practice, the tendency is for it to catch or pinch, by reason of the disposition of the cylinders to draw it in between them. By placing it, as shown in Fig. 1, below the center the above-named defect is wholly obviated, for the tendency is for the cylinders to throw it off; but the scraper being made with the plates pivoted and held in place upon the roller by the weight J and its connections, the action is uniform. Another advantage is that the black does not, when scraped off or loosened, cling to the rollers by adhesion or other attraction and get carried into the flame and burned up. Th above-described scrapers are intended to be used on rollers while they are in motion. A very good way to do is to stop the rollers while scraping them. When this is done the scraper may rest on top of the rollers as well as not. In Figs. 6 and 7 I show a scraper for this purpose. The scraping-blades in this case are on a cross-head, and are shown as pivoted thereto, although it is not essential that they be so attached. They are made with a curve which is concentric with the curve of the cylinders, so that they will conform to the surface of the latter. The cross-head is moved back and forth by a rod or handle, L. After each movement of this scraper over the surface of the roller the latter is turned a little, so as to bring a new and unscraped part of the surface in position to be operated upon. In these Figs. 6 and 7 a spout, l, or it may be a box, is shown extending down from the scraping-blades, to catch and convey or retain the detached lamp-black. This device may be used on any form of scraper.

Q represents a tank which is divided into two compartments, T T, by a partition formed of cloth bags R, filled with sand or other granulated substance, which, when saturated with benzine or other volatile hydrocarbon, will, when air is forced through the tank from the pipe S to the pipe B, (thus passing through the bags,) generate a hydrocarbon gas. If natural gas be forced through the carburetor, instead of air, the benzine will be enriched, and if the natural pressure be too great, as is most often the case, it will be so subdued as to feed the burners properly.

The lower compartment, T, may be filled with benzine and the air forced through it as well as the saturated bags; or it may contain only a small quantity of benzine, and the air or gas may be blown upon it before it passes through the bags. If desired, a coil of steam-pipe may be placed in this chamber and the benzine volatilized by heating. I make no specific claim to the above-described carburetor, but only show it as one form of device to which I may attach my machine, reserving, however, the right to make claims therefor in another application.

I have found in operating my machine, by saturating the air used with a vapor, that much more black can be obtained from a given number of flames. The vapor-saturated air produces a more perfect decomposition of the gas while burning without adding to the combustion, while any air produces a flame which burns up more or less of the carbon. To utilize this discovery I place below the burners a pan, U, in which I keep warm water, that throws off a sufficient vapor to properly saturate the air as it passes to the burners. In Fig. 3 I show a perforated pipe, $u'$, through which steam is passed to serve the same purpose— i. e., charging the air with vapor; but if this device is used care must be taken not to overcharge the air with moisture.

I am aware that it is common to use steam-vapor in connection with the air supplied to furnaces, but always for the purpose of augmenting the combustion; but the use of vapor-saturated air, in connection with the flames of a lamp-black machine, for the purpose of increasing the amount of freed carbon I believe to be new.

I am also aware that it is not new to provide lamp-black machines with pivoted and adjustable scrapers provided with troughs or pans for catching the black. These devices differ from mine, in that the plates are straight and pivoted at their bottom to the edge of the pan, necessitating the placing of the depositing-surfaces some distance apart, thus increasing the size of the machine without increasing its producing capacity. This would be found very inconvenient when several hundred pairs of plates are used, whereas by curving the plates more or less to conform to a peripheral section of the cylinders and attaching them by their middle to a cross-head from which the cross-head may be suspended the cylinders can be brought closer together. Therefore

What I claim as new is—

1. In a lamp-black machine, a scraper curved to conform more or less to a peripheral section of the cylinders, and attached by its middle to a cross-head adapted to be moved back and forth between the cylinders.

2. In a lamp-black machine, a scraper curved to conform more or less to a peripheral section of the cylinders, and attached by its middle to a cross-head adapted to be moved back and forth between the cylinders, and provided with a trough attached thereto, for the purpose set forth.

3. In a lamp-black machine, a scraper pivoted at its middle to a cross-head, and provided with a counter-balance attached below the pivotal point, for the purpose set forth.

4. In a lamp-black machine, a scraper pivoted at its middle to a cross-head, and having S-shaped levers or rods attached below the pivotal point and a weight suspended from their lower ends, for the purpose set forth.

5. In a lamp-black machine, a scraper pivoted at its middle to a cross-head suspended upon a rod extending from front to rear of the machine, said scraper having a counter-balance attached below the pivotal point, for the purpose set forth.

6. In a lamp-black machine, the combination of the service-pipe and burners with a case having plates N N, arranged parallel to each other on opposite sides of the burner and some distance apart, substantially as shown, to protect the flame from lateral currents of air.

7. In a lamp-black machine, the combination of a service-pipe and burner thereon with plates placed parallel to each other on opposite sides of the burner, some distance apart, forming openings above and below, for the purpose set forth, and having their upper part curved, substantially as shown, and for the purpose described.

8. In a lamp-black machine, the combination of a service-pipe and burners arranged thereon with a case having shields placed parallel to each other on opposite sides of the burners, and some distance apart, forming openings at top and bottom, for the purpose set forth, and an adjustable damper-plate below the lower opening, substantially as and for the purpose described.

9. In a lamp-black machine, the combination, with a depositing-plate and its burners, of an air-duct located at one side of the burner, and inclined, substantially as shown, to cause a jet of air to impinge upon the flame at the point where the flame impinges upon the depositing-plates.

10. In a lamp-black machine, the combination of the burners and depositing-plates with a vertical zigzagged chimney located above the plates, as and for the purpose set forth.

11. In a lamp-black machine, the combination of depositing-plates, arranged in pairs, and having burners located under each surface, with a zigzagged chimney located between each pair, for the purpose set forth.

12. In a lamp-black machine, a vertical zigzagged chimney having a scraper of the same contour of the chimney in vertical section.

13. In a lamp-black machine, the combination of a case having burners and air-supplying ducts, with an aqueous-vapor supplying source, substantially as described, for saturating with moisture the air entering the case, for the purpose set forth.

14. In a lamp-black machine, the combination of the depositing-plates with burners mounted upon service-pipes, with a carburetor connected to the service-pipes by a main, and an aqueous-vapor-supplying source for saturating the air entering the case, for the purpose set forth.

In testimony that I claim the foregoing I have hereunto set my hand this 18th day of December, 1880.

ERASTUS R. BLOOD.

Witnesses:
JNO. K. HALLOCK,
M. N. LOVELL.